(12) United States Patent
Su et al.

(10) Patent No.: US 12,294,409 B2
(45) Date of Patent: May 6, 2025

(54) SILICON OPTICAL CHIP WITH INTEGRATED ANTENNA ARRAY

(71) Applicant: Global Technology Inc., Ningbo (CN)

(72) Inventors: Sheng Su, Ningbo (CN); Fan Yang, Ningbo (CN); Qikun Huang, Ningbo (CN)

(73) Assignee: Global Technology Inc., Ningbo (CN)

( * ) Notice: Subject to any disclaimer, the term of this patent is extended or adjusted under 35 U.S.C. 154(b) by 160 days.

(21) Appl. No.: 18/125,968

(22) Filed: Mar. 24, 2023

(65) Prior Publication Data

US 2024/0120998 A1   Apr. 11, 2024

(30) Foreign Application Priority Data

Oct. 9, 2022   (CN) .......................... 202211224890.5

(51) Int. Cl.
*H04B 10/11* (2013.01)
*H01Q 21/06* (2006.01)
*H04B 10/50* (2013.01)
*H04J 14/02* (2006.01)

(52) U.S. Cl.
CPC ............. *H04B 10/11* (2013.01); *H01Q 21/06* (2013.01); *H04B 10/504* (2013.01); *H04J 14/0307* (2023.08)

(58) Field of Classification Search
CPC .. H04B 10/11; H04B 10/504; H04B 10/2575; H04J 14/0307; H01Q 21/06
USPC .......................................................... 398/79
See application file for complete search history.

(56) References Cited

U.S. PATENT DOCUMENTS

| | | | |
|---|---|---|---|
| 9,130,613 B2* | 9/2015 | Oren | H04B 7/022 |
| 10,312,999 B2* | 6/2019 | Neuman | H04B 10/118 |
| 10,686,523 B1* | 6/2020 | Gleason | H01Q 21/065 |
| 10,735,095 B1* | 8/2020 | Kim | H04B 10/25752 |
| 11,522,630 B1* | 12/2022 | He | H04B 1/40 |
| 11,564,020 B1* | 1/2023 | Xu | H04B 10/25 |
| 2014/0231627 A1* | 8/2014 | Wakatsuki | H01Q 3/2676 |
| | | | 250/208.2 |
| 2018/0332372 A1* | 11/2018 | Liu | H04B 10/25754 |
| 2019/0157757 A1* | 5/2019 | Murakowski | H04B 10/548 |
| 2019/0267708 A1* | 8/2019 | Tennant | H04B 10/505 |
| 2022/0094459 A1* | 3/2022 | Haraguchi | H01Q 3/26 |

(Continued)

*Primary Examiner* — Dalzid E Singh
(74) *Attorney, Agent, or Firm* — Grossman Tucker Perreault & Pfleger, PLLC

(57) ABSTRACT

A silicon optical chip with integrated antenna array comprises a wavelength division multiplexer, antenna array, photodiode, amplifier, and electro-optical modulator. The wavelength division multiplexer is configured to receive an optical signal with a plurality of wavelengths and to divide the optical signal into a plurality of wavelength division optical signals, or is configured to integrate a plurality of wavelength division optical signals into optical signals to output. The antenna array is configured to receive or transmit radio frequency signals. The amplifier is signally connected to the photodiode and the antenna and is configured to amplify the radio frequency signal received by the antenna. The electro-optical modulator is signally connected to the amplifier and the wavelength division multiplexer and is configured to transform the amplified radio frequency signal into wavelength division optical signals to input to the wavelength division multiplexer.

6 Claims, 2 Drawing Sheets

(56) References Cited

U.S. PATENT DOCUMENTS

2022/0166137 A1\* 5/2022 Galli ................... H04B 10/00
2024/0275487 A1\* 8/2024 Laguna .............. H04B 10/1129

\* cited by examiner

SILICON OPTICAL CHIP WITH INTEGRATED ANTENNA ARRAY

CROSS-REFERENCE TO RELATED APPLICATIONS

This non-provisional application claims priority under 35 U.S.C. § 119(a) on Patent Application No(s). 202211224890.5 filed in China on Oct. 9, 2022, the entire contents of which are hereby incorporated by reference.

BACKGROUND

1. Technical Field

This disclosure relates to an optical chip, especially to a silicon optical chip with integrated antenna array.

2. Related Art

One significant characteristic of the electromagnetic wave is that, with higher frequency and shorter wavelength, its propagation path is more likely to approach a straight line, which comes with lowered diffraction ability. As such, the higher frequency transmission and the greater the attenuation in the propagation medium usually go hand in hand.

5G network, particularly of a high-frequency band above 250 GHz, suffers the problem of shorter propagation distance and lesser signal coverage, which makes the number of 5G base stations required to cover an area to be much more than that of base stations for 4G network covering the same area.

With the developing trend of the current mobile communication network, the existing network may have difficulty supporting the rising rate of data transmission. To increase the network capacity, smart and efficient usage of network resources is essential for optimization and improving the user's experience. In the future, the network must be a heterogeneous mobile network with coexisted networks. Therefore, every network has to be managed efficiently and the mutual-operation has to be simplified to increase the network capacity.

SUMMARY

Accordingly, this disclosure provides a silicon optical chip with integrated antenna array.

According to one or more embodiment of this disclosure, a silicon optical chip with integrated antenna array is disclosed. The disclosed optical chip comprises a first wavelength division multiplexer, a second wavelength division multiplexer, an antenna array, a plurality of photodiodes, a plurality of first amplifiers, a plurality of second amplifiers, and a plurality of electro-optical modulators. The first wavelength division multiplexer is configured to receive a first optical signal with various wavelengths and to divide the first optical signal into a plurality of first wavelength division optical signals. The second wavelength division multiplexer is configured to integrate a plurality of second wavelength division optical signals of different wavelengths into a second optical signal, which is then output. The photodiodes are signally connected to the first wavelength division multiplexer and configured to convert the plurality of first wavelength division optical signals into a plurality of first radio frequency signals. The plurality of first amplifiers are electrically connected to the photodiodes and the antenna arrays and configured to amplify the plurality of first radio frequency signals and output the plurality of first radio frequency signals that are amplified through the antenna array. The second amplifiers are electrically connected to the antenna array and configured to receive second radio frequency signals through the antenna array and to amplify the second radio frequency signals. The electro-optical modulators are signally connected to the second amplifiers and the second wavelength division multiplexer and configured to convert the amplified second radio frequency signals into the second wavelength division signals and output the plurality of second wavelength division signals to the second wavelength division multiplexer.

In view of the above description, the disclosed optical chip integrated with an antenna array and an electro-optical modulator can transform a received optical signal into a radio frequency signal which is then transmitted to other antennas through the antenna array, or modulate an optical signal with the radio frequency signal received through the antenna array. Accordingly, an optical transmission device with low power consumption, small size, high performance, simple organization, and the capability of transmitting or receiving signals with a base station can be achieved.

The above descriptions of the content of this disclosure and the following illustrations about the embodiments serve to demonstrate and explain the spirit and the principle of the present invention, and to provide further explanations to the claims of the present invention.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
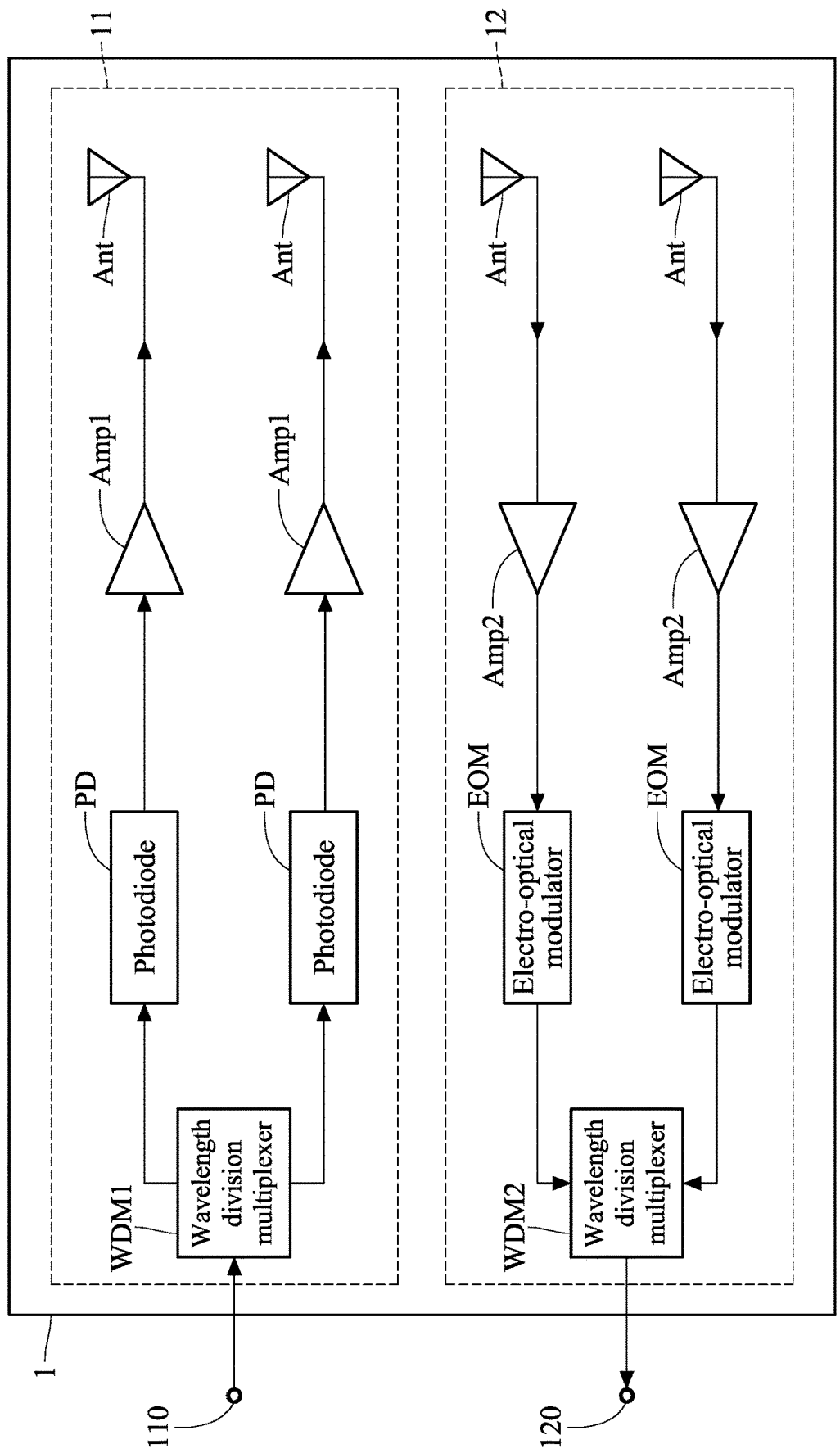
FIG. 1 is a block diagram of a silicon optical chip with an integrated antenna array according to an embodiment of the present disclosure.

Please refer to FIG. 1 which is a block diagram of a silicon optical chip with an integrated antenna array according to an embodiment of the present disclosure. A silicon optical chip 1 may include a first module 11 and a second module 12. A first terminal 110 of the first module 11 is configured to receive a first optical signal, and output a plurality of first radio frequency signals through a plurality of antennas (Ant). A plurality of antennas Ant of the second module 12 are configured to receive a plurality of second radio frequency signals, and output a second optical signal through a second terminal 120 of the second module 12. The antennas Ant of the first module 11 and the antennas Ant of the second module 12 may be together referred to as an antenna array Ant. The first module 11 of the silicon optical chip 1 includes a first wavelength division multiplexer WDM1, a plurality of photodiodes PD, a plurality of first amplifiers Amp1, and a plurality of antennas Ant (which are referred to as an transmission antenna array Ant in the following descriptions).

The first wavelength division multiplexer WDM1 is configured to receive a first optical signal with various wavelengths and divide the first optical signal into a plurality of first wavelength division optical signals. The photodiode PD is signally connected to the first wavelength division multiplexer WDM1 and configured to transform the plurality of first wavelength division optical signals into a plurality of first radio frequency signals. The first amplifier Amp1 is electrically connected to the plurality of photodiodes PD and the transmission antenna array Ant and configured to amplify the plurality of first radio frequency signals before outputting the amplified first radio frequency signals through the transmission antenna array Ant. The transmission antenna array Ant might include a plurality of antennas and is configured to output the plurality of amplified first radio frequency signals.

The second module 12 of the silicon optical chip 1 includes a second wavelength division multiplexer WDM2, a plurality of electro-optical modulators EOM, a plurality of second amplifiers Amp2, and a plurality of antennas Ant (which are referred to as an receiving antenna array Ant in the following descriptions). The receiving antenna array Ant is configured to receive a plurality of second radio frequency signal. The second amplifier Amp2 is electrically connected to the receiving antenna array Ant, in order to receive a plurality of second radio frequency signals through the receiving antenna array Ant and to amplify the plurality of second radio frequency signals. The electro-optical modulator EOM is signally connected to the plurality of second amplifiers Amp2 and the second wavelength division multiplexer WDM2 and configured to transform the amplified second radio frequency signals into the second wavelength division signals, before outputting the second wavelength division signals to the second wavelength division multiplexer WDM2. The second wavelength division multiplexer WDM2 is configured to integrate second wavelength division optical signals with different wavelengths into a second optical signal to output.

Through the above configuration, the first wavelength division multiplexer WDM1 may receive a first optical signal with various wavelengths therein, and the two optical signals with different wavelengths may be a digital signal and an analog signal respectively, or both are digital signals or both are analog signals. In one implementation, the first optical signal may be a combination of a digital signal with a wavelength of 1510 nm and an analog signal with a wavelength of 1490 nm. Therefore, the first wavelength division multiplexer WDM1 may separate the first optical signal into two first wavelength division optical signals based on their wavelength difference. In the current example, the two first wavelength division optical signals could be the digital signal with the wavelength of 1510 nm and the analog signal with the wavelength of 1490 nm. With the above arrangement, the first optical signal could be with various information in different signal formats so as to improve signal transmission efficiency. In addition, the two separated signals with different wavelengths from the first optical signal may both be digital signals or analog signals. FIG. 1 exemplarily demonstrates that the first wavelength division multiplexer WDM1 receives the first optical signal with two different wavelengths and outputs them through two channels respectively.

However, in other embodiments, the first wavelength division multiplexer WDM1 can receive the first optical signals with more than two different wavelengths and output them respectively with a corresponding number of optical paths. Similarly, the signals separated from the first optical signal with more than two different wavelengths can be any combination of the digital signals and/or the analog signals.

Following the descriptions above, the plurality of first wavelength division optical signals may be transmitted to the photodiode PD through optical fibers before the generation of different first radio frequency signals. Although the difference between the two first radio frequency signals is not explicitly shown in FIG. 1, each of the first radio frequency signals should naturally carry the information of the first wavelength division optical signal from which it originates. For example, if the first wavelength division optical signal is a digital signal, the corresponding first radio frequency signal being a digital signal might result. More details would be provided in another embodiment of the present disclosure below. When the first radio frequency signal is amplified by the first amplifier, it may be transmitted outward through the transmission antenna Ant.

The receiving antenna array Ant of the second module 12 receives the second radio frequency signal and transmits it to the second amplifier Amp2. The amplified second radio frequency signal may be transmitted to the electro-optical modulator EOM, which is configured to modulate the optical signal before generating a plurality of second wavelength division optical signals with different wavelengths. The second wavelength division modulator WDM2 is configured to receive the second wavelength division optical signals before generating a second optical signal. The second optical signal is then transmitted through optical fiber. Similar to the first module 11, the receiving antenna array Ant may receive various radio frequency signals, for example, in digital form and analog form. Each of the second wavelength division optical signals generated by each electro-optical modulator EOM may have a different wavelength, e.g. 1470 nm and 1500 nm. Having different wavelengths prevents the integration in the second wavelength division multiplexer from being interfered with by each other. In addition, the second wavelength division optical signals with different wavelengths may all be digital signals or analog signals. FIG. 1 exemplarily demonstrates that the second wavelength division multiplexer WDM2 receives the second wavelength division optical signals with two different wavelengths and integrates them into a corresponding second optical signal. However, in other embodiments, the second wavelength division multiplexer WDM2 can receive the second wavelength division optical signals with more than two different wavelengths. Such second wavelength division optical signals similarly could be with more than two different wavelengths while could be in any combination of digital signals and/or analog signals.

Figure 2:
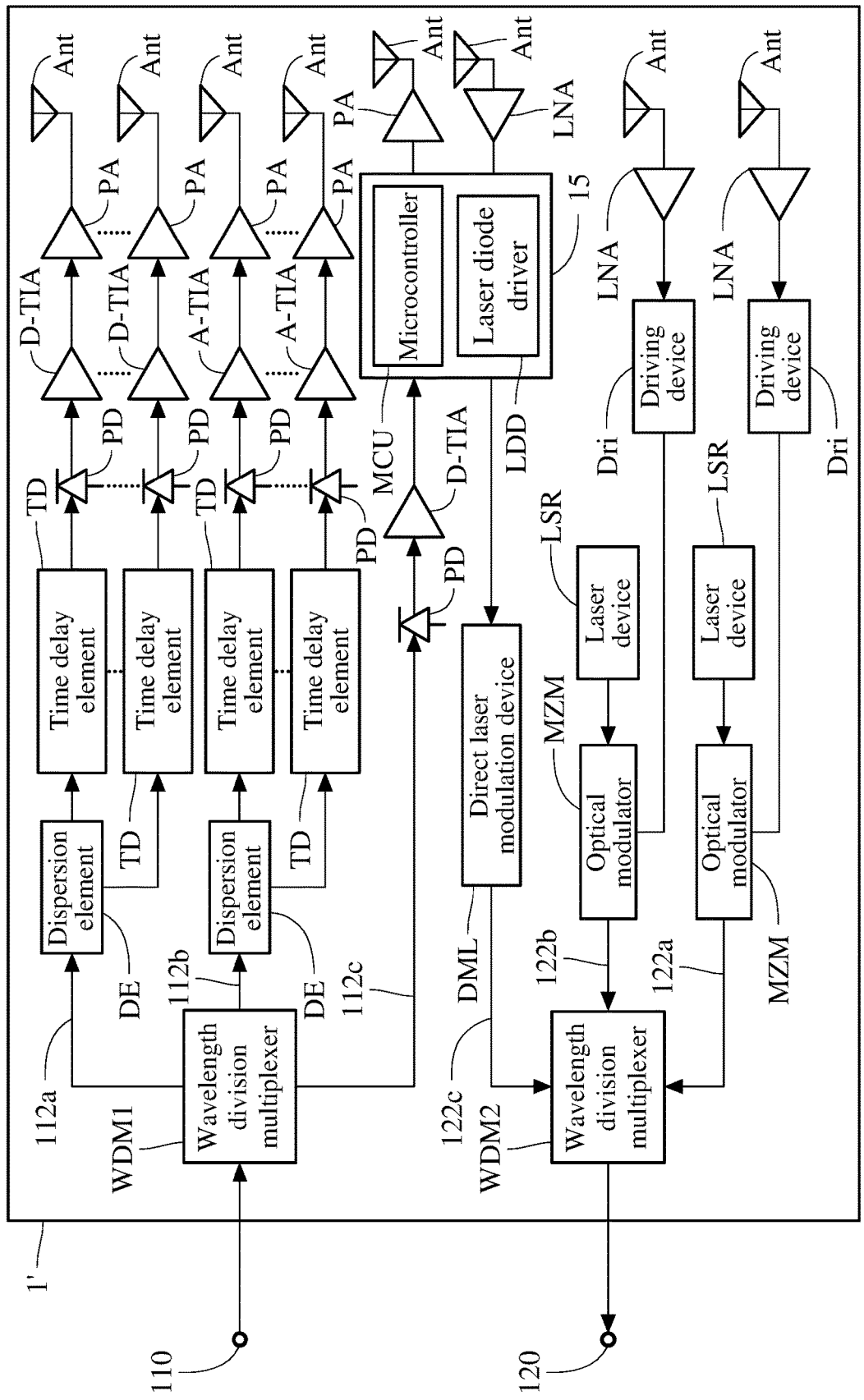
FIG. 2 is a block diagram of a silicon optical chip with integrated antenna array according to another embodiment of the present disclosure.

Please refer to FIG. 2 which is a block diagram of a silicon optical chip with integrated antenna array according to another embodiment of the present disclosure. In the present embodiment, the silicon optical chip 1' might include the first wavelength division multiplexer WDM1, the second wavelength division multiplexer WDM2, the photodiode PD, the electro-optical modulator, the amplifiers (including the first amplifier Amp1 and the second amplifier Amp2), and the antenna array Ant as illustrated in the embodiment in FIG. 1 with the same connection configurations. The difference between the embodiment of FIG. 1 and the embodiment of FIG. 2 lies in the details of elements such as the amplifiers and the electro-optical modulator that are further specified in below. The amplifier of the present embodiment may be various amplifiers. In one implementation, the first amplifier may include a trans-impedance amplifier and a power amplifier PA, with the trans-impedance amplifier connected to the photodiode PD and the power amplifier PA connected to the trans-impedance amplifier and the transmission antenna Ant. The trans-impedance amplifier may include a digital trans-impedance amplifier D-TIA and an analog trans-impedance amplifier A-TIA to correspond to different signals. In other words, the digital trans-impedance amplifier D-TIA may correspond to digital signals and the analog trans-impedance amplifier A-TIA may correspond to analog signals. It should be noted that, FIG. 2 only exemplarily illustrates the configuration positions of D-TIA and A-TIA, and in other embodiments, D-TIA and A-TIA may be adjusted according to the type of signals to be transmitted by the corresponding channel. Furthermore, the second amplifier may include a low-noise amplifier LNA to improve the signal-to-noise ratio of the second radio frequency signal.

In the silicon optical chip 1' of the present embodiment, there may be a dispersion element BS and a time delay element TD disposed between the first wavelength division multiplexer WDM1 and the photodiode PD. The dispersion element BS is signally connected to the first wavelength division multiplexer WDM1 to further split each of the first wavelength division optical signals. The time delay element TD is signally connected to the time delay element TD to adjust a phase of the split first wavelength division optical signal, for rendering tunable a phase delay among different split first wavelength division optical signals. The dispersion element BS may be, for example, a grating, prism, or beam splitter, and the time delay element TD may be a variety of wave plates with mediums of various refractive indexes, such as a quarter-wave plate or half-wave plate. Notably, the dispersion element BS and the time delay element TD may be selectively disposed in the present invention.

In the present embodiment, the silicon optical chip 1' may further include a signal processing component 15 connected to at least one of the plurality of photodiodes PD, at least one of the plurality of electro-optical modulators, and the antenna array Ant. The signal processing component 15 might include a microcontroller MCU and a laser diode driver LDD, and is configured to perform signal processing for at least one of the plurality of first radio frequency signals and one of the plurality of second radio frequency signals. Furthermore, the at least one of the first radio frequency signals and/or the at least one of the second radio frequency signals may be digital. Notably, the signal processing component 15 may be selectively disposed.

In the present embodiment, the plurality of electro-optical modulators of the silicon optical chip 1' may include a laser device LSR, a driving device Dri, and an optical modulator MZM (Mach-Zehnder Modulator). The laser device LSR is configured to generate an initial optical signal. The driving device Dri is connected to the second amplifier Amp2 and configured to receive a second modulation signal and to output an optical modulation signal. The optical modulator MZM is signally connected to the laser device LSR and the driving device Dri, and configured to modulate the initial optical signal with the optical modulation signal and to output the second wavelength division optical signal. In addition, the plurality of electro-optical modulators of the silicon optical chip 1' may also include a direct laser modulation device DML signally connected to the laser diode driver LDD, which is configured to modulate the DML allowing for the DML to generate one of the plurality of second wavelength division optical signals.

In the present embodiment, for example, the first optical signal with multiple wavelengths is divided into three first wavelength division optical signals through the first wavelength division multiplexer WDM1. The three first wavelength division optical signals propagate along the first wavelength division optical channels 112a, 112b, and 112c, respectively. In one implementation, the optical signal propagating along the first wavelength division optical channel 112a is a digital signal with a wavelength of 1530 nm, the optical signal propagating along the first wavelength division optical channel 112b is an analog signal with a wavelength of 1510 nm, and the optical signal propagating along the first wavelength division optical channel 112c is a digital signal with a wavelength of 1490 nm. The following describes the three signals mentioned here to illustrate the various combinations and variations of the present embodiment.

Please refer to the first wavelength division optical channel 112a shown in FIG. 2, wherein the optical signal is divided into two optical signals through the dispersion element BS, and the phases of the two optical signals are modulated by the time delay element TD. There are a plurality of first radio frequency signals generated after the optical signals are input to the photodiodes PD. The first radio frequency signals are input to the analog trans-impedance amplifier A-TAI and the power amplifier PA to be amplified before being transmitted through the transmission antennas Ant.

As a person with ordinary skill in the art can understand, the first radio frequency signal output by the transmission antennas array Ant of the silicon optical chip 1' may be the second radio frequency signal received by the receiving antennas array Ant of another module with the same configuration as that of the silicon optical chip 1'. The second radio frequency signal received by the receiving antennas array Ant of the second module is amplified through the low-noise amplifier LNA, and then transmitted to the driving device Dri. The driving device Dri may generate an optical modulation signal based on the second radio frequency signal. The optical modulation signal may be used in an optical modulator MZM so that an initial optical signal received by the optical modulator MZM could be modulated accordingly to generate a second wavelength optical signal. The second wavelength optical might propagate along the second wavelength division optical channel 122a. Additionally, the optical modulator MZM may be a Mach-Zehnder modulator, which is a device that uses particular photoelectric characteristics of specific material, such as lithium niobate ($LiNbO_3$) crystal or the like, to modulate optical signals.

Please refer to the second wavelength division optical channel 112b shown in FIG. 2. The configuration of channels for signals (from the first wavelength division optical channel 112b to the second wavelength division optical channel 122b) is basically the same as that of the channels for the first wavelength division optical signal. The major difference is that the signal in this configuration is analog instead of digital, and therefore corresponds to the analog trans-impedance amplifier A-TIA.

Please refer to the third wavelength division optical channel 112c shown in FIG. 2. The first wavelength division optical signal may be transmitted to the photodiode PD to generate a first radio frequency signal without passing through the dispersion element BS or the time delay element TD. The first radio frequency signal is transmitted to the digital trans-impedance amplifier D-TIA. Different from the above, the first radio frequency signal may be transmitted to the antenna array Ant through the signal processing component 15. The microcontroller unit MCU in the signal processing component 15 may manipulate the first radio frequency signal. In the second module, the second radio frequency signal received by the antenna array Ant may be transmitted to the direct laser modulation device DML through the signal processing component 15 and the laser diode driver LDD of the signal processing component 15 may be configured to process the second radio frequency signal to achieve modulation of the direct laser modulation device DML, which would output the second wavelength division optical signal.

At this point, the wavelength division multiplexer WDM (or the second wavelength division multiplexer) of the second module may integrate the second wavelength division optical signals with various wavelengths from different second wavelength division optical channels 122a, 122b, and 122c, to generate a second optical signal and transmit it to another module or system through the second terminal 120. Accordingly, the need for long-range communication (such as on-tower or outdoor) can be fulfilled through optical fiber communication, while the need for expansive-area communication (such as indoor or within a certain range) can be fulfilled through the antenna array.

In view of the above description, the disclosed optical chip integrated with an antenna array and an electro-optical modulator can transform a received optical signal into a radio frequency signal which is then transmitted to other antennas through the antenna array, or modulate the optical signal with the radio frequency signal received through the antenna array before the transmission of the same through the optical fiber. Accordingly, an optical transmission device with low power consumption, small size, high performance, easy organization, and the capability of transmitting or receiving signals with a base station can be realized. In addition to the basic 1T1R (one-transmit-one-receive) transmission form, the silicon optical chip with integrated antenna array of some embodiments of the present invention may implement a multiple-transmit-multiple-receive transmission through the wavelength division multiplexer, the dispersion element, the antenna array, and the electro-optical modulator with plural channels. And such application may be further expanded with a flexible combination of digital and analog signals. In the case of complex networking and terminal devices with small volume and low power consumption, an integrated radio-over-fiber (ROF) optical module integrating digital and analog signals could eliminate the digital to analog (DAC) modulation part of the general remote antenna unit (RAU). In addition, the silicon optical chip with integrated antenna array provided by some embodiments of the present invention may be combined into a distributed antenna system (DAS), before connecting to various signal sources through various transmitting media to construct a mobile communication network. An antenna circuit directly transmitting and modulating through the radio frequency signal may effectively improve the modulating linearity and the bandwidth, with advantages of flexible networking, terminal devices with small sizes, and high efficiency of using internet resources.

Although the present invention is disclosed in the foregoing embodiments, it is not intended to limit the present invention. Changes and modifications made without departing from the spirit and scope of the present invention belong to the scope of patent protection of the present invention. For the scope defined by the present invention, please refer to the attached claims.

What is claimed is:

1. A silicon optical chip with integrated antenna array, comprising:
   a first wavelength division multiplexer configured to receive a first optical signal with a plurality of wavelengths and to divide the first optical signal into a plurality of first wavelength division optical signals;
   a second wavelength division multiplexer configured to integrate a plurality of second wavelength division optical signals into a second optical signal;
   an antenna array comprising a plurality of antennas;
   a plurality of photodiodes signally connected to the first wavelength division multiplexer and configured to transform the plurality of first wavelength division optical signals into a plurality of first radio frequency signals;
   a plurality of first amplifiers electrically connected to the plurality of photodiodes and the antenna array, and configured to amplify the plurality of first radio frequency signals and output the plurality of first radio frequency signals that are amplified through the antenna array, wherein the plurality of first amplifiers comprise a plurality of trans-impedance amplifiers and a plurality of power amplifiers, the plurality of trans-impedance amplifiers are connected to the plurality of photodiodes, wherein the plurality of trans-impedance amplifiers comprise a digital trans-impedance amplifier and an analog trans-impedance amplifier, and the plurality of power amplifiers are connected to the plurality of trans-impedance amplifiers and the antenna array;
   a plurality of second amplifiers electrically connected to the antenna array, and configured to receive a plurality of second radio frequency signals through the antenna array and to amplify the plurality of second radio frequency signals, wherein the plurality of second amplifiers comprise a plurality of low-noise amplifiers; and
   a plurality of electro-optical modulators signally connected to the plurality of second amplifiers and the second wavelength division multiplexer, and configured to transform the plurality of second radio frequency signals that are amplified into the plurality of second wavelength division signals and output the plurality of second wavelength division signals to the second wavelength division multiplexer.

2. The silicon optical chip with integrated antenna array of claim 1, further comprising:
   a dispersion element signally connected to the first wavelength division multiplexer, and configured to split one of the plurality of first wavelength division optical signals; and
   a time delay element signally connected to the dispersion element, and configured to adjust a phase of the first wavelength division optical signal that is split.

3. The silicon optical chip with integrated antenna array of claim 1, further comprising a signal processing component connected to at least one of the plurality of photodiodes, at least one of the plurality of electro-optical modulators, and the antenna array, wherein the signal processing component comprises a microcontroller and a laser diode driver, and is configured to perform a signal processing to at least one of the plurality of first radio frequency signals and at least one of the plurality of second radio frequency signals.

4. The silicon optical chip with integrated antenna array of claim 3, wherein each of the at least one of the plurality of electro-optical modulators comprises:
- a direct laser modulation device signally connected to the laser diode driver, and configured to be modulated by the laser diode driver to generate one of the plurality of second wavelength division optical signals.

5. The silicon optical chip with integrated antenna array of claim 3, wherein the at least one of the plurality of first radio frequency signals or the at least one of the plurality of second radio frequency signals is a digital signal.

6. The silicon optical chip with integrated antenna array of claim 1, wherein at least one of the plurality of electro-optical modulators comprises:
- a laser device configured to generate an initial optical signal;
- a driving device connected to one of the plurality of second amplifiers, and configured to receive one of the plurality of second radio frequency signals and to output an optical modulation signal; and
- an optical modulator signally connected to the laser device and the driving device, and configured to modulate the initial optical signal with the optical modulation signal and then output one of the plurality of second wavelength division optical signals.

* * * * *